(12) United States Patent
Raub et al.

(10) Patent No.: US 7,341,414 B2
(45) Date of Patent: Mar. 11, 2008

(54) FASTENER AND METHOD FOR REDUCING STRESS FAILURE IN AN ENGINE COMPONENT

(75) Inventors: Jonathan H. Raub, Columbus, IN (US); Robert G. Tickel, Columbus, IN (US); William R. Storkman, Columbus, IN (US)

(73) Assignee: Cummins Inc., Columbus, IN (US)

( * ) Notice: Subject to any disclaimer, the term of this patent is extended or adjusted under 35 U.S.C. 154(b) by 143 days.

(21) Appl. No.: 11/118,772

(22) Filed: May 2, 2005

(65) Prior Publication Data

US 2006/0245842 A1 Nov. 2, 2006

(51) Int. Cl.
*F16B 35/00* (2006.01)

(52) U.S. Cl. ...................... 411/395; 411/392

(58) Field of Classification Search ................ 411/392, 411/395
See application file for complete search history.

(56) References Cited

U.S. PATENT DOCUMENTS

| | | | | |
|---|---|---|---|---|
| 1,780,675 A | * | 11/1930 | Hewitt | ........................ 411/271 |
| 1,784,377 A | * | 12/1930 | Moore | ........................ 411/393 |
| 1,987,474 A | | 1/1935 | Grant | |
| 2,021,704 A | | 11/1935 | Thatcher et al. | |
| 2,542,377 A | * | 2/1951 | Turkish | ........................ 411/334 |
| 3,425,588 A | | 2/1969 | Mathews | |
| 3,669,301 A | | 6/1972 | Witkin | |
| 3,695,139 A | | 10/1972 | Howe | |
| 3,925,678 A | * | 12/1975 | Curtis | ........................ 29/509 |
| 4,090,544 A | | 5/1978 | Bagheri et al. | |
| 4,225,981 A | | 10/1980 | Zeibig | |
| 4,307,816 A | | 12/1981 | Manasas | |
| 4,346,920 A | | 8/1982 | Dailey | |
| 4,348,141 A | * | 9/1982 | Dahl | ........................ 411/389 |
| 4,735,537 A | | 4/1988 | Rath | |
| 4,820,098 A | | 4/1989 | Taubert et al. | |
| 4,973,209 A | | 11/1990 | Essom et al. | |
| 5,304,022 A | | 4/1994 | Huska | |
| 5,964,560 A | | 10/1999 | Henriksen | |
| 6,062,786 A | | 5/2000 | Garver et al. | |
| 6,120,227 A | | 9/2000 | Murase et al. | |
| 6,155,761 A | | 12/2000 | Donovan | |
| 6,361,085 B2 | * | 3/2002 | Nguyen | ........................ 285/368 |
| 6,971,362 B2 | * | 12/2005 | Gunji et al. | ............ 123/195 R |
| 2004/0206328 A1 | * | 10/2004 | Gunji et al. | ............ 123/195 H |
| 2006/0245842 A1 | * | 11/2006 | Raub et al. | .................. 411/378 |

FOREIGN PATENT DOCUMENTS

JP 2004278765 A * 10/2004

* cited by examiner

*Primary Examiner*—Katherine Mitchell
(74) *Attorney, Agent, or Firm*—Nixon Peabody LLP; Tim L. Brackett, Jr.; J. Bruce Schelkopf

(57) ABSTRACT

A fastener and a method for reducing stress failure in a fastening joint of an internal combustion engine component are provided. The threaded fastener may be a bolt or a stud secured to an engine block. The fastener has a threaded tip portion with a radius and a distal end. The threaded tip portion is inserted into a threaded hole to define a threaded interface. In one embodiment, the load carrying capability is increased by progressively reducing the radius of at least a part of the threaded tip portion. In another embodiment, the load carrying capability is increased by an axially extending hole at the distal end of the threaded tip portion, the hole having a progressively reduced diameter.

19 Claims, 3 Drawing Sheets

FASTENER AND METHOD FOR REDUCING STRESS FAILURE IN AN ENGINE COMPONENT

BACKGROUND OF THE INVENTION

1. Field of the Invention

The present invention is directed to a fastener, fastener joint, and a method for reducing stress in an internal combustion engine component.

2. Description of Related Art

Various designs for threaded fasteners are known for addressing different problems associated with fasteners. For example, U.S. Pat. No. 4,973,209 to Essom et al. discloses a screw for use in contaminated pre-tapped holes. The reference discloses a locking screw having a head at one end, a special entry portion at the other end, and a trilobular shank portion extending from the entry portion toward the head. The screw is disclosed as having a thread profile that is of a double angle configuration, and having an entry section that is tapered and formed with a series of truncations which serve to clear progressively, a contaminating coating in an internally threaded workpiece, such as a nut.

U.S. Pat. No. 6,120,227 to Murase et al. discloses a self-aligning bolt that corrects misalignment of the bolt even when the bolt is inserted slanted into a mating hole or a nut. The reference discloses that the bolt includes a constant diameter columnar portion having a diameter smaller than that of a bolt shank portion. The columnar portion is disclosed as being formed on an end portion of the bolt shank portion, and includes a short tapered portion therebetween.

U.S. Pat. No. 4,090,544 to Bagheri et al. discloses a self-locking screw fastener with at least one radially outwardly protruding lobe which serves to lock the screw fastener when in use. The screw fastener is disclosed as having an externally screw threaded fastener body with a longitudinal bore with a reduced inner axial portion and an outer axial portion of enlarged diameter. The reference further discloses that to form the protruding lobe, a noncircular mandrel is forced into the bore to expand the reduced inner portion thereof.

Numerous different fasteners have been used for internal combustion engine components. These different fasteners secure various engine components together to allow the engine to function properly. Many fasteners are subjected to high torque to tightly secure internal combustion engine components together, and are subjected to significant clamping loads. For example, main bearing bolts are used to secure bearing caps to the engine block. Cylinder head studs and/or bolts are used to tightly secure the cylinder head to the engine block. In both of these applications, high torquing of the fasteners is required to establish high clamping loads, and the fasteners are subjected to high cyclical loads caused by the operation of the internal combustion engine.

After long periods of use, it has been found that stress crack and joint failure can occur in the internal combustion engine components at these locations. In this regard, such failures have been found especially when the fastener joint is subjected to additional stress. For example, in continuing to improve their products, an engine manufacturer may increase the power or torque output of their internal combustion engine by increasing the cylinder pressures. This may be attained through various ways, including modification of the internal combustion engine or by optimizing engine operational parameters. Such increase in cylinder pressures of internal combustion engine has been found to cause stress cracks at the threads engaged by the main bearing. If such stress cracking and joint failure occurs in the engine block, the repair can be extremely expensive. Therefore, there exists an unfulfilled need for a method for reducing stress failures at fastening joints in an internal combustion engine that can be caused by cyclical loading of highly torqued fasteners when cylinder pressures are increased.

SUMMARY OF THE INVENTION

In view of the foregoing, an advantage of the present invention is in providing a threaded fastener for specifically reducing stress failures in a fastening joint of an internal combustion engine.

In accordance with one aspect of the present invention, a fastener joint that reduces stress failure in an internal combustion engine component is provided. In one embodiment, the fastener joint includes a threaded hole in the internal combustion engine component, and a threaded fastener having a threaded tip portion with a radius and a distal end. The threaded tip portion is inserted into the threaded hole of the internal combustion engine component to engage the threaded hole, and define a threaded interface between the threaded hole and the threaded tip portion. In accordance with the present invention, the threaded fastener includes a stress reduction means for increasing the load carrying capability of at least a portion of the threaded interface.

In one embodiment of the fastener joint, the stress reduction means includes progressive reduction of the radius of at least a part of the threaded tip portion. In this regard, the radius may be progressively reduced to the distal end of the threaded tip portion. In one implementation, approximately 3 to 10 threads of the threaded tip portion from the distal end have reduced radius.

In accordance with another embodiment of the fastener join, the stress reduction means includes an axially extending hole at the distal end having a progressively reduced diameter away from the distal end. In this regard, the largest diameter of the hole may be positioned at the distal end. In one implementation, the largest diameter of the hole is approximately 35-60% of a major diameter of the threaded fastener, and the hole as a depth dimension of approximately 60-110% of a major diameter of the threaded fastener.

Still another aspect of the present invention is in providing a fastener that reduces stress failure of a fastening joint of an internal combustion engine component. In one embodiment, the fastener includes an elongated shank, and a threaded tip portion on the elongated shank with a radius and a distal end. The threaded tip portion at least partially defines a threaded interface when in use, and the radius of at least a part of the threaded tip portion is progressively reduced toward the distal end. In one embodiment, approximately 3 to 10 threads of the threaded tip portion from the distal end have reduced radius.

In another embodiment, the fastener includes a threaded tip portion with an axially extending hole at the distal end having a progressively reduced diameter away from the distal end. In one embodiment, the largest diameter of the hole is approximately 35-60% of a major diameter of the threaded fastener, and the hole as a depth dimension of approximately 60-110% of a major diameter of the threaded fastener.

In accordance with another aspect of the present invention, a method for reducing stress failure in a fastening joint of an internal combustion engine component is provided. In one embodiment, the method includes providing a threaded hole in the internal combustion engine component, providing a threaded fastener having a threaded tip portion with a radius and a distal end, and inserting the threaded tip portion into the threaded hole of the internal combustion engine component to define a threaded interface between the threaded tip portion and the threaded hole. The method further includes increasing the load carrying capability of at least a portion of the threaded interface.

In accordance with one implementation, the present method includes progressively reducing the radius of at least a part of the threaded tip portion. In this regard, the radius may be progressively reduced to the distal end to reduce the stress at the distal end of the threaded fastener. In one implementation, approximately 3 to 10 threads of the threaded tip portion from the distal end have reduced radius.

In accordance with another implementation, the present invention includes providing an axially extending hole at the distal end of the threaded tip portion, the hole having a progressively reduced diameter away from the distal end. In this regard, the largest diameter of the hole may be positioned at the distal end. In another implementation, the largest diameter of the hole is approximately 35-60% of a major diameter of the threaded fastener, and the hole as a depth dimension of approximately 60-110% of a major diameter of the threaded fastener.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

Figure 1:
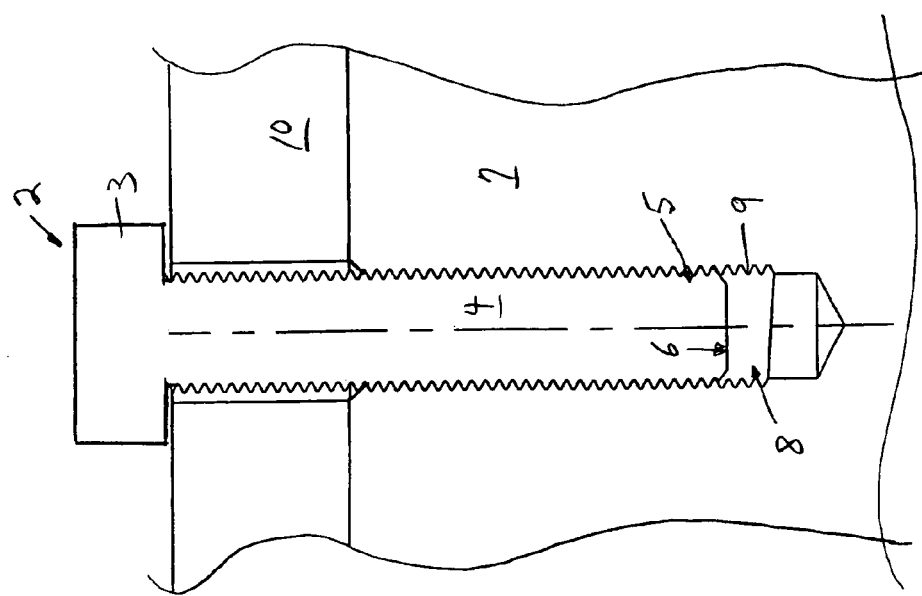
FIG. 1 is a cross-sectional view of a prior art threaded fastener used in an internal combustion engine component.

FIG. 1 shows a cross-sectional view of a prior art threaded fastener 2 that is used in an internal combustion engine. As can be appreciated, the threaded fastener 2 is a bolt. The threaded fastener 2 is used to secure two components of an internal combustion engine together, for example, to secure a cylinder head 10 to the engine block 7 in FIG. 1. As can be seen, the threaded fastener 2 includes a head 3, a shank 4, and a threaded tip portion 5 which terminates at a distal end 6. The threaded tip portion 5 is inserted into a threaded hole 8 that is provided in the internal combustion engine component, for example, the engine block 7 shown. The threaded hole 8 includes threads 9 that are engaged by the threaded tip portion 5 of the threaded fastener 2, thereby defining a threaded interface between the threaded tip portion 5, and the threaded hole 8.

By tightening the threaded fastener 2 into the threaded hole 8, the cylinder head 10 is securely clamped to the engine block 7. However, after long periods of use or increase in the force fastener is subjected to additional stress, it has been found that stress cracks can form in the internal combustion engine component thereby causing a joint failure. For example, as noted, if the cylinder pressures are increased through modification of the internal combustion engine, the increase in cylinder pressures has been found to cause stress cracks at the threads engaged by the main bearing.

Figure 2:
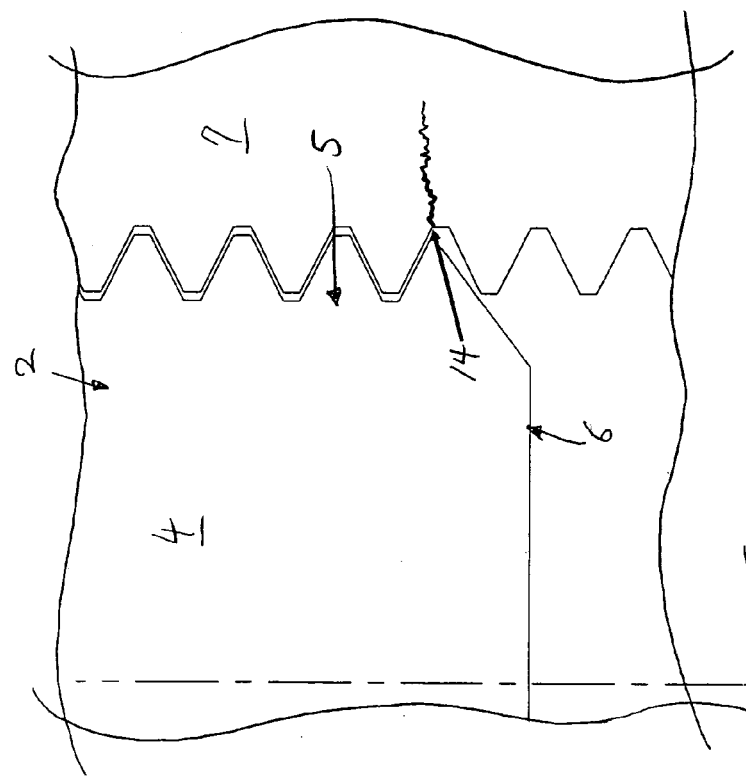
FIG. 2 is an enlarged cross-sectional view of the stress failure that can occur at the threaded interface when the prior art threaded fastener of FIG. 1 is used.

FIG. 2 shows an enlarged cross-sectional view of the threaded interface between the threaded fastener 2 and the engine block 7. As shown, stress fracture 14 has been observed to occur in the engine block 7. Such fractures can diminish the durability and reliability of the internal combustion engine. Such stress cracks 14 have been observed to especially occur in high torque applications where the threaded fastener 2 is subjected to cyclical loading. Examples include main bearing bolts, and cylinder head studs/bolts. It has further been observed by the Applicants of the present invention that such stress cracks 14 typically occur at the threaded tip portion 5 of the threaded fastener 2. In particular, such stress cracks 14 have been observed to occur relatively close to the distal end 6 of the threaded fastener 2.

The applicants of the present invention have found that the threaded tip portion 5 of the threaded fastener 2 exerts a force on the threads 9 of the threaded hole 8 which is higher than the remaining engaged threads on the shank 4 of the threaded fastener 2. In other words, disproportionate amount of stress occurs at the threaded interface between the threaded tip portion 5 and the threads 9 of the threaded hole 8. Correspondingly, this can result in a stress crack 14 in the internal combustion component as shown in FIG. 2. The stress crack 14 has been found to more likely occur proximate to the distal end 6 of the threaded fastener 2 as clearly shown in FIG. 2. Even with torque-to-yield tightening of the fasteners, maximum stress and corresponding strain amplitudes occur at the threaded tip portion 5, especially as the cylinder pressures and loads increase in the internal combustion engine. Further, such stress cracks 14 occur proximate to the distal end 6 of the threaded fastener 2 because whereas most of the engaged threads 9 of the threaded hole 8 are under compression, threads proximate to the distal end 6 are not under compression. Thus, the highest stress/strain amplitudes in the threads 9 of the threaded hole 8 tends to be proximate to the distal end 6 of the threaded fastener 2.

Figure 3:
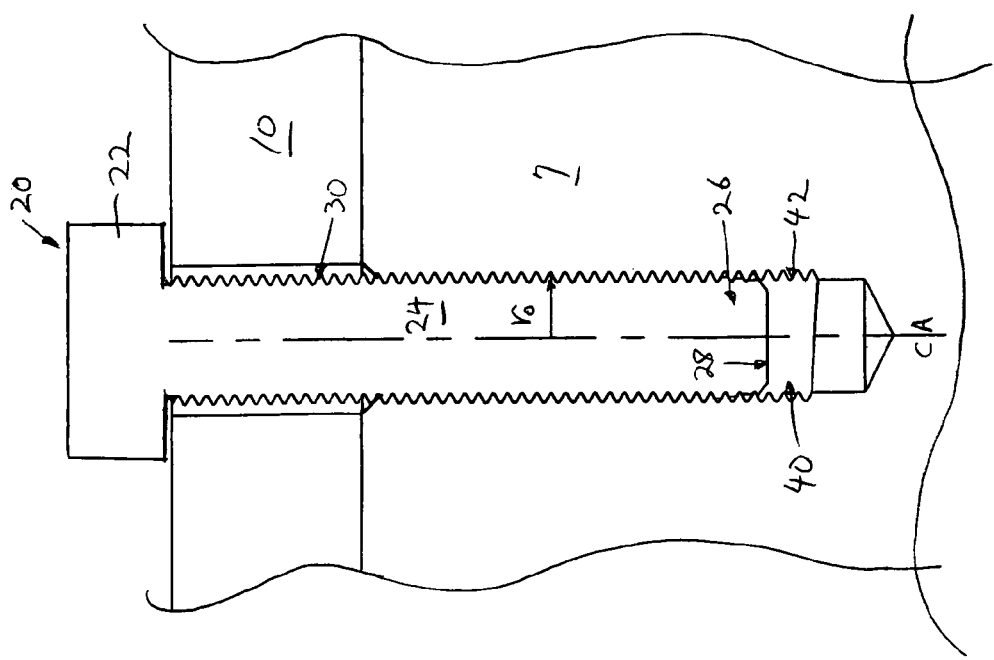
FIG. 3 is a cross-sectional view of a threaded fastener in accordance with one example embodiment of the present invention.

To address the above-identified problem associated with the conventional threaded fasteners and application thereof in internal combustion engine components, novel threaded fasteners are disclosed herein which include a stress reduction means that increases the load carrying capability of at least a portion of the threaded interface between the threaded tip portion of the fastener and the threaded hole by reducing stress and/or strain amplitudes. In this regard, FIG. 3 shows a cross-sectional view of a threaded fastener 20 for an internal combustion engine component in accordance with one example implementation of the present invention.

In particular, in a manner described above relative to FIG. 1, the threaded fastener 20 is a cylinder head bolt but may also be a main bearing bolt. The threaded fastener 20 includes a head 22, and an elongated shank 24 having a threaded tip portion 26 that terminates at distal end 28. As shown, the elongated shank 24 of the threaded fastener 20 includes threads 30 thereon. The threaded fastener 20 is used to secure the cylinder head 10 to the engine block 7. In this regard, the engine block 7 is provided with a threaded hole 40 having threads 42 therein. The threads 30 of the threaded fastener 28 engage the threads 42 of the threaded hole 40 to allow clamping of the cylinder head 10 to the engine block 7 in the manner known. The threaded tip portion 26 of the threaded fastener 20 engages the threads 42 of the threaded hole 40 to define a threaded interface between the threaded hole 40 of the internal combustion engine component and the threaded tip portion 26. As described in further detail below, the threaded fastener 20 is provided with a stress reduction means for increasing the load carrying capability on at least a portion of the threaded interface so as to reduce the occurrence of the stress crack such as that shown and discussed above relative to FIG. 2.

Figure 4:
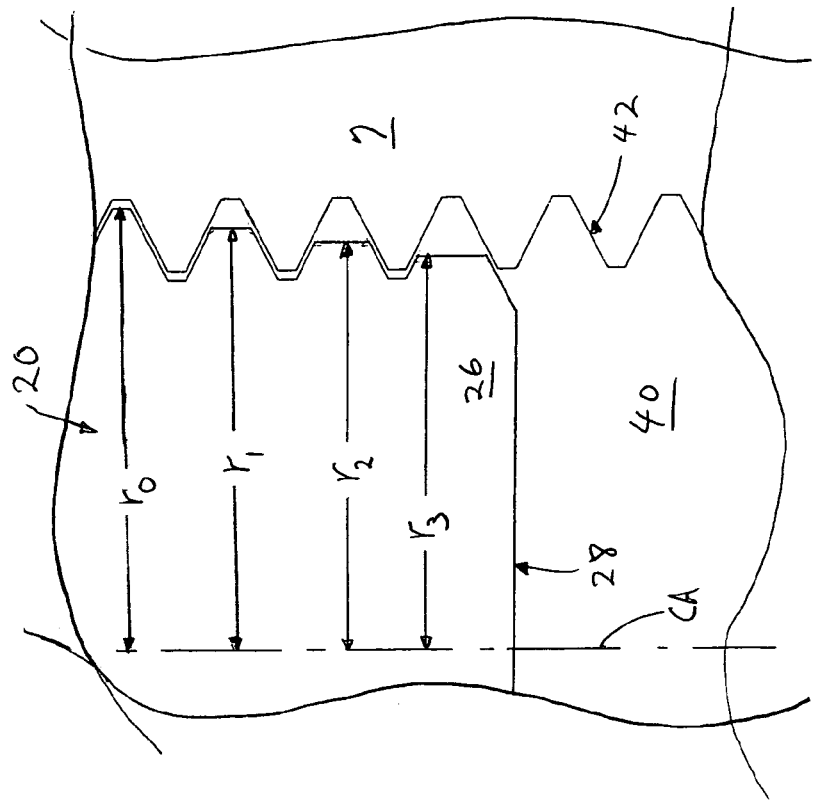
FIG. 4 is an enlarged cross-sectional view of the threaded tip portion of the threaded fastener of FIG. 3 and the threaded interface provided thereby.

In the above regard, FIG. 4 shows an enlarged cross-sectional view of the threaded tip portion 26 of the threaded fastener 20 that is received within the threaded hole 40 of the engine block 7. The threaded fastener 20 is provided with a stress reduction means which, in the illustrated embodiment, includes progressive reduction of the radius of at least a part of the threaded tip portion 26. More specifically, the radius of the threads of the threaded tip portion 26 as measured from the central axis CA (alternatively, the major diameter of the threaded tip portion 26) is progressively reduced. In the illustrated embodiment of FIG. 4, the radius of the threaded tip portion is progressively reduced to the distal end 28 of the threaded tip portion 26. In the enlarged view of FIG. 4, $R_0$ represents the standard radius from the central axis CA for most of the threads of the threaded fastener 20 (major diameter being twice the radius from the central axis CA). As can be seen in FIG. 4, the radius of the threads of the threaded tip portion 26 from the central axis CA becomes progressively smaller toward the distal end 28, that is, $R_0 > R_1 > R_2 > R_3$.

The rate of the decrease in the radius of the threads can vary based on the application, the length of the threaded fastener, and the desired reduction in stress. However, reducing the radius of approximately 3 to 10 threads at the threaded portion tip 26 has been found to be sufficient to reduce the likelihood of stress cracks in may applications, FIGS. 3 and 4 showing a threaded fastener in which 3 threads have been reduced in diameter.

The above-described progressive reduction of the radius of the threaded tip portion 26 of the threaded fastener 20 has been found to increase the load carrying capability of the threaded interface between the threaded tip portion 26 and the threaded hole 40 of the internal combustion engine component such as the engine block 7. Correspondingly, when the radius of the threaded tip portion 26 is progressively reduced to the distal end 28 in the manner shown in FIG. 4, the occurrence of stress cracks in the engine block 7 is reduced. The disclosed geometry of the threads increases the load carrying capability of the threaded interface by progressively reducing the surface contact between the threads of the threaded tip portion 26 and the threads 42 of the threaded hole 40 so that the threads of the threaded tip portion 26 does not transfer as much force to the threaded hole 40 as compared to conventional fasteners.

In addition, it should be noted that whereas in the illustrated embodiment of FIG. 4, only three of the threads in the threaded tip portion 26 are shown as having reduced radius, other implementations of the present embodiment may be provided with additional threads that have reduced radius, i.e., $R_0 > R$. Of course, it should also be noted that whereas the last thread at the threaded portion tip 26 (i.e. the thread with $R_3$) is shown as engaging the threads 42 of the threaded hole 40, in other embodiments, additional threads or a lead-in tip may be provided which need not engage the threads 42 of the threaded hole 40.

Figure 5:
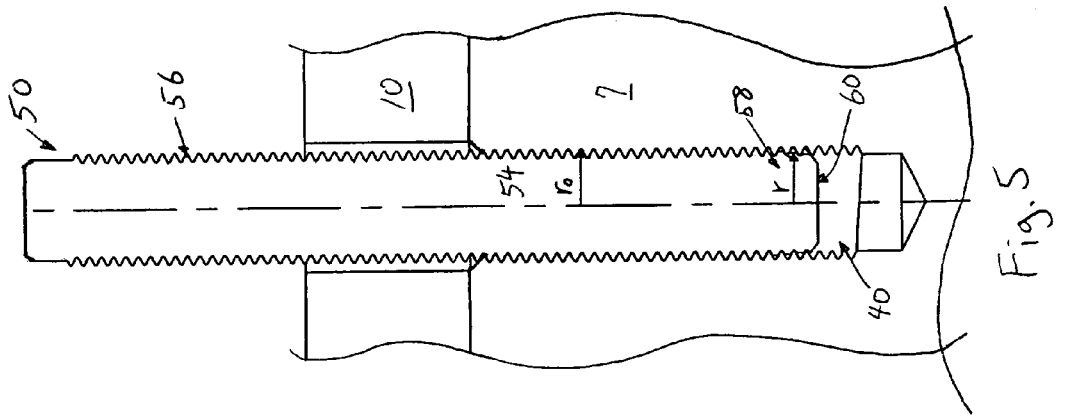
FIG. 5 is a cross-sectional view of a threaded fastener in accordance with another example embodiment of the present invention.

FIG. 5 shows a cross-sectional view of a threaded fastener 50 in accordance with another example embodiment of the present invention. As can be seen, the threaded fastener 50 is implemented as a cylinder head stud having an elongated shank 54 with threads 56. The threaded fastener 56 includes a threaded tip portion 58 that is received in the threaded hole 40 provided in the internal combustion engine component such as engine block 7. The threaded fastener 50 is used to secure two components of an internal combustion engine together, i.e. to secure the cylinder head 10 to the engine block 7.

In the manner described relative to FIG. 3 discussed above, the threaded fastener 50 includes a stress reduction means in which the radius of at least part of the threaded tip portion 58 is progressively reduced toward the distal end 60. In this regard, at the threaded tip portion 58 of the threaded fastener 50, radius $R_0 > R$ in a manner similar to that as shown in FIG. 4 described above. By progressively reducing the radius of at least part of the threaded tip portion 58, the load carrying capability of the threaded interface between the threads 56 of the threaded fastener 50 and the threaded hole 40 is increased. Correspondingly, reduction in the occurrence of stress cracks in the internal combustion engine component such as the engine block 7 is realized.

Figure 6:
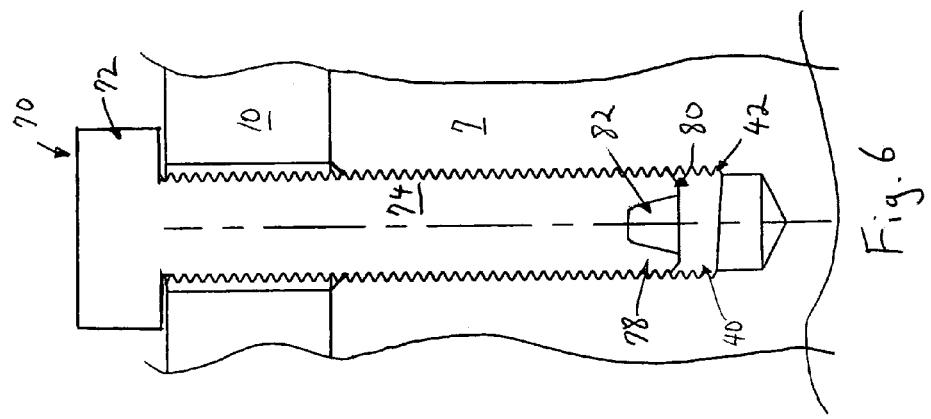
FIG. 6 is a cross-sectional view of a threaded fastener in accordance with still another example embodiment of the present invention.

FIG. 6 shows a cross-sectional view of a threaded fastener 70 in accordance with yet another embodiment of the present invention which includes a stress reduction means. As can be seen, the threaded fastener 70 is a cylinder head bolt which is used to clamp the cylinder head 10 and the engine block 7 together. Of course, the threaded fastener 70 may also be a main bearing bolt for an internal combustion engine. The threaded fastener 70 is provided with a head 72 and a shank 74 having a threaded tip portion 78 that terminates at the distal end 80. The threaded tip portion 78 of the threaded fastener 70 engages the threads 42 of the threaded hole 40 provided in the internal combustion engine component, for instance, the engine block 7 in the illustrated example.

The threaded fastener 70, includes an axially extending hole 82 that extends from the distal end 80 of the threaded tip portion 78 into the shank 74. The axially extending hole 82 is implemented to have a progressively reduced diameter away from the distal end 80 such that it has a frusta-conical shape as shown in FIG. 6. Thus, in the embodiment shown, the largest diameter of the hole 82 is positioned at the distal end 80 of the threaded tip portion 78. The provision of the axially extending hole 82 has been found to significantly increase the load carrying capability of the threaded interface between the threads of the threaded tip portion 78, and the threads 42 of the threaded hole 40. This is attained by the fact that material thickness supporting the threads of the threaded tip portion 78 is reduced, thereby reducing stiffness of the threaded tip portion and allowing small deflection of the threaded tip portion 78 that limits the amount of force that can be transferred from the threaded tip portion 78 to the threaded hole 40. This correspondingly results in reduced occurrence of stress cracks in the internal combustion engine component, such as the engine block 7 shown in FIG. 6.

The diameter and the depth of the hole 82 depends on the size of the threaded fastener, etc. However, effective ranges for the dimensions of the hole has been found relative to the major diameter of the threaded fastener. In this regard, the diameter of the hole 82 at the distal end 80 may be approximately 35-60% of the major diameter of the threaded fastener (i.e. the diameter of the threaded fastener at the shank). In addition, the depth of the hole may be approximately 60-110% of the major diameter of the threaded fastener. The rate at which the diameter is progressively reduced may vary in different applications depending on proportions of the diameter and the depth, as well as on the size of the threaded fastener, and the machining capabilities. However, a threaded fastener having an axially extending hole with the above described proportional dimensions has been found to effectively increase the load carrying capability of the threaded interface so as to reduce occurrence of stress cracks. In providing the hole 82, care should be taken so as to avoid sharp corners in the hole so as to prevent stress concentrating features. This may be attained by providing a radius at the end of the hole 82, i.e. end of the frusta-conical shape.

For example, in one example implementation, an M18× 1.5 bolt having a length of 170 millimeters may be provided with an axially extending hole 82 that is approximately between 11-20 millimeters deep from the distal end 80, and having a diameter at the distal end 80 of approximately 6 to 11 millimeters. In this regard, an axially extending hole having a depth of approximately 15 millimeters, and a diameter of approximately 9 millimeters at the distal end 80 has been found to be especially advantageous in a M18×1.5 bolt having a length of 170 millimeters. Of course, in different applications where the size of the threaded fastener is bigger or smaller than that noted, the dimensions of the axially extending hole can be proportionately increased or decreased, respectively, from the described approximate size range noted. In addition, different dimensions for the hole can be used in other implementations.

Figure 7:
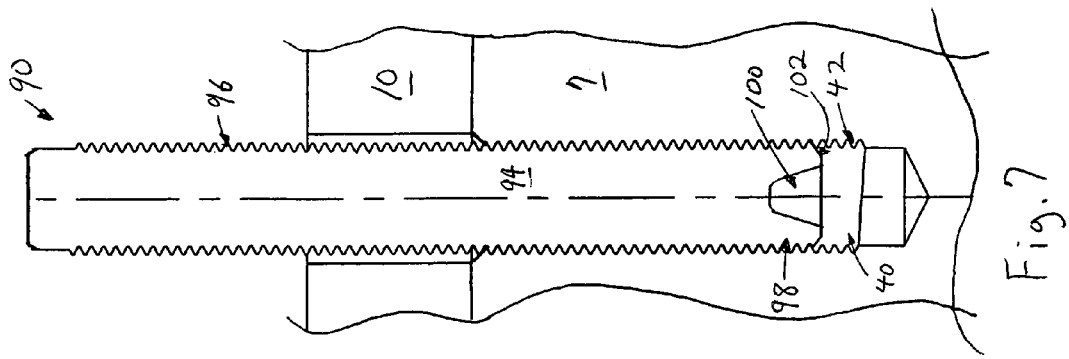
FIG. 7 is a cross-sectional view of a threaded fastener in accordance with yet another example embodiment of the present invention.

FIG. 7 shows a cross-sectional view of a threaded fastener 90 in accordance with still another example implementation of the present invention. As can be appreciated, the threaded fastener 90 is implemented as a cylinder head stud that may be used to secure the cylinder head 10 and the engine block 7 together. In this regard, the threaded fastener 90 includes a shank 94 having threads 96. The shank portion 94 includes a threaded tip portion 98 that engages the threads 42 of the threaded hole 40 so as to define a threaded interface between the threaded hole 40 and the threaded tip portion 98.

In the manner similar to that described above relative to the embodiment of FIG. 6, the threaded fastener 90 includes a stress reduction means including an axially extending hole 100 that is open to the distal end 102 of the threaded tip portion 98. The hole 100 increases the load carrying capability of at least a portion of the threaded interface between the threaded tip portion 98 and the threaded hole 40 in the manner previously described, thereby reducing the occurrence of stress cracks. The proportional dimensions of the hole 100 may be substantially similar to the hole described with respect to FIG. 6. In this regard, whereas the threaded fastener 90 is significantly longer than that of the threaded fastener 70 described in FIG. 6, the dimensions of the axially extending holes is largely driven by the diameter of the threaded fastener more so than the length, assuming that the total length of the fastener is significantly greater than the length of the axially extending hole.

As described above, the threaded fastener of the present invention may be a bolt or a stud, or may be other similarly threaded fastener, such as a screw that is used to secure internal combustion engine components together. The threaded fastener and may be made of any appropriate material including brass, various steels, etc., but is preferably made of hardened steel to handle high clamping loads. The threaded fastener may also be treated with a coating, plating, etc. Of course, the threaded fastener will have a particular dimension including length, diameter, thread pitch, as required by the specific application. The internal combustion engine component may be an engine block or other component, and may be made of any appropriate material such as iron, aluminum alloys, etc.

It should also be apparent from the discussion above that another aspect of the present invention is in providing a method for reducing stress failure in a fastening joint of an internal combustion engine component. As note previously, the threaded fastener may be a bolt, a stud, or a screw, and the internal combustion engine component may be an engine block.

In accordance with one embodiment, the method includes providing a threaded hole in the internal combustion engine component, providing a threaded fastener having a threaded tip portion with a radius and a distal end, and inserting the threaded tip portion into the threaded hole of the internal combustion engine component to define a threaded interface between the threaded tip portion and the threaded hole. The method further includes increasing the load carrying capability of at least a portion of the threaded interface.

Accordingly, in one implementation, the reduction in the stress is attained by progressively reducing the radius of at least a part of the threaded tip portion. Preferably, the radius is progressively reduced to the distal end. In another implementation, the method includes providing an axially extending hole at the distal end of the threaded tip portion, the hole having a progressively. reduced diameter away from the distal end. In this embodiment, the largest diameter of the hole is preferably positioned at the distal end.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A fastener joint that reduces stress failure in an internal combustion engine component, the fastener joint comprising:

a threaded hole in the internal combustion engine component; and a threaded fastener having a threaded tip portion with a radius and a distal end, the threaded tip portion being inserted into the threaded hole of the internal combustion engine component to engage the threaded hole, and define a threaded interface between the threaded hole in the internal combustion engine component and the threaded tip portion;

wherein the threaded fastener includes a stress reduction means for increasing load carrying capability of at least a portion of the threaded interface between the threaded hole in the internal combustion engine component and the threaded tip portion;

wherein the threaded tip portion includes an axially extending hole at the distal end with the axially extending hole having an opening at the distal end and a hole end positioned at a depth away from the distal end, the axially extending hole including a progressively reduced diameter portion extending continuously from the opening at the distal end to the hole end.

2. The fastener joint of claim 1, wherein the stress reduction means includes progressive reduction of the radius of at least a part of the threaded tip portion.

3. The fastener joint of claim 2, wherein the radius is progressively reduced to the distal end of the threaded tip portion.

4. The fastener joint of claim 3, wherein approximately 3 to 10 threads of the threaded tip portion from the distal end have reduced radius.

5. The fastener joint of claim 1, wherein the largest diameter of the hole is positioned at the distal end.

6. The fastener joint of claim 1, wherein the largest diameter of the hole is approximately 35-60% of a major diameter of the threaded fastener.

7. The fastener joint of claim 1, wherein the hole has a depth dimension of approximately 60-110% of a major diameter of the threaded fastener.

8. The fastener joint of claim 1, wherein the internal combustion engine component is an engine block.

9. A fastener that reduces stress failer of a fastening joint of an internal combustion engine component, the fastener comprising:
an elongated shank; and
a threaded tip portion an a distal end, the threaded tip portion at least partially defining a threaded interface with a threaded hole provided in the internal combustion engine component when in use;
wherein the threaded tip portion includes an axially extending hole at the distal end with the axially extending hole having an opening at the distal end and a hole end a depth away from the distal end, the axially extending hole including a progressively reduced diameter portion extending continuously from the opening at the distal end to the hole end.

10. The fastener of claim 9, wherein the largest diameter of the hole is approximately 35-60% of a major diameter of the threaded fastener.

11. The fastener joint of claim 9, wherein the hole has a depth dimension of approximately 60-110% of a major diameter of the threaded fastener.

12. A method for reducing stress failure in the fastening joint of claim 1, of an internal combustion engine component, the method comprising:
providing a threaded hole in the internal combustion engine component;
providing a threaded fastener having a threaded tip portion with a radius and a distal end;
inserting the threaded tip portion into the threaded hole of the internal combustion engine component to define a threaded interface between the threaded tip portion and the threaded hole in the internal combustion engine component; and
increasing the load carrying capability of least a portion of the threaded interface.

13. The method of claim 12, further including progressively reducing the radius of at least a part of the threaded tip portion.

14. The method of claim 13, wherein the radius is progressively reduced to the distal end.

15. The method of claim 13, wherein approximately 3 to 10 threads of the threaded tip portion from the distal end have reduced radius.

16. The method of claim 12, further including providing an axially extending hole at the distal end of the threaded tip portion, the hole having a progressively reduced diameter away from the distal end.

17. The method of claim 16, wherein largest diameter of the hole is positioned at the distal end.

18. The method of claim 16, wherein the largest diameter of the hole is approximately 35-60% of a major diameter of the threaded fastener.

19. The method of claim 16, wherein the hole has a depth dimension of approximately 60-110% of a major diameter of the threaded fastener.

* * * * *